United States Patent
Tangney (10) Patent No.: US 7,736,093 B2
(45) Date of Patent: Jun. 15, 2010

(54) SUBMARINE WATER RESERVOIR

(76) Inventor: Peter John Tangney, 1/37 Alfred Street, Rozelle, New South Wales 2039 (AU)

( * ) Notice: Subject to any disclaimer, the term of this patent is extended or adjusted under 35 U.S.C. 154(b) by 318 days.

(21) Appl. No.: 11/659,435

(22) PCT Filed: Aug. 2, 2005

(86) PCT No.: PCT/AU2005/001146

§ 371 (c)(1), (2), (4) Date: Jul. 25, 2007

(87) PCT Pub. No.: WO2006/012684

PCT Pub. Date: Feb. 9, 2006

(65) Prior Publication Data

US 2008/0080935 A1    Apr. 3, 2008

(30) Foreign Application Priority Data

Aug. 2, 2004    (AU)   ................. 2004904292

(51) Int. Cl.
   *B65D 88/78*   (2006.01)
(52) U.S. Cl. ...................................... 405/210
(58) Field of Classification Search ............... 405/210, 405/52, 53, 54, 55, 63, 64, 195.1
   See application file for complete search history.

(56) References Cited

U.S. PATENT DOCUMENTS

| 3,230,967 | A | * | 1/1966 | Castro | 405/210 |
|---|---|---|---|---|---|
| 3,425,791 | A | * | 2/1969 | Koberg | 405/210 |
| 3,540,397 | A | * | 11/1970 | Burns | 405/210 |
| 3,587,116 | A | * | 6/1971 | Quase | 4/300 |
| 4,059,065 | A | | 11/1977 | Clark et al. | |
| 4,231,873 | A | | 11/1980 | Swigger | |
| 4,335,977 | A | * | 6/1982 | Ihli | 405/210 |
| 4,506,623 | A | * | 3/1985 | Roper et al. | 405/210 |
| 4,735,524 | A | * | 4/1988 | Dunkers | 405/210 |
| 6,388,342 | B1 | * | 5/2002 | Vetterick et al. | 290/53 |
| 7,261,164 | B2 | * | 8/2007 | Hollier | 405/210 |
| 2002/0040904 | A1 | | 4/2002 | Lee | |
| 2002/0148401 | A1 | | 10/2002 | Eagles et al. | |
| 2002/0178987 | A1 | | 12/2002 | Eagles et al. | |
| 2002/0185438 | A1 | | 12/2002 | Johnstone | |
| 2003/0226489 | A1 | | 12/2003 | Carter | |

FOREIGN PATENT DOCUMENTS

| AU | 2003246047 | | 4/2004 |
|---|---|---|---|
| DE | 2713756 | | 5/1978 |
| DE | 196 00 560 | | 7/1997 |
| EP | 0 687 625 | | 12/1995 |
| EP | 0 728 537 | | 8/1996 |
| FR | 2 583 722 | | 12/1986 |
| GB | 2 284 629 | | 6/1995 |
| JP | 52048116 A | * | 4/1977 |
| JP | 8-58880 | | 3/1996 |
| JP | 2004-156283 | | 6/2004 |
| WO | WO 87/06212 | | 10/1987 |

* cited by examiner

*Primary Examiner*—Frederick L Lagman
(74) *Attorney, Agent, or Firm*—Ladas & Parry LLP (57) ABSTRACT

A method of storing water by restraining at least one flexible storage reservoir in a submerged position within a body of salt water; establishing a terrestrial intake in fluid communication with the flexible storage reservoir; and establishing a terrestrial outlet in fluid communication with the flexible storage reservoir for the release of stored water.

24 Claims, 6 Drawing Sheets

Fig. 4 example coastal configuration (satellite)

$$\frac{\text{seawater} \quad 1{,}025 \text{ kg.}}{\text{freshwater} \quad 999 \text{ kg.}} = 1.02602603$$

1 cubic metre of fresh water above sea level will balance 38 cubic metres of fresh water below sea level.

Submarine Reservoir

| | | |
|---|---|---|
| | 254 | m³ stored above sea level |
| 79 | | m³ bottom of upper |
| 30 | | m³ pipe/ cut through rock |
| 219 | | m³ manifold |
| 9,419 | | m³ 5 x reservoirs |
| 9,746 | | m³ |
| | 9,746 | m³ stored below sea level |
| | 10,000 | m³ total storage |
| | 10 ML | total storage |

10,000 m³ total storage equals 10 mega litres

Fig. 5A

A large roof

| | | |
|---|---|---|
| 400 | m | length |
| 100 | m | width |
| 40,000 | m² | catchment (roof) area |
| 250 | mm | maximum rainful event (nb: 1990-2003 maximum single day's rain was 186mm) |

| | | |
|---|---|---|
| 10,000,000 | litre | runoff |
| 10 | ML | runoff |

Fig. 6C(iii)

Fig. 6C(ii)

SUBMARINE WATER RESERVOIR

FIELD OF THE INVENTION

The field of the invention relates generally to reservoirs the storing of liquid and in particular to a submarine reservoir for the storage of water.

BACKGROUND OF THE INVENTION

The storage of water can be a particular problem in urban environments. Many urban environments have developed in coastal areas where there is a relatively high rainfall. If the run-off from these urban areas in the form of urban stormwater could be captured and reused, the need to build more dams could be delayed or removed altogether.

It is common for water catchments to be in the form of a dam across a river valley. These dams are very expensive to construct and often consume large amounts of valuable agricultural land. Such dams also destroy all pre-existing life in the river valley and the plant material captured within the artificial lake can result in the generation of significant amounts of greenhouse gases from decomposing plan material. Although in some cases this greenhouse gas production can be offset by the production of hydroelectricity, generally speaking it is not desirable to build dams.

In many geographic locations it is common for a source of fresh water to be located relatively close to an urban environment but this source of fresh water may not be suitable for capture by a conventional means such as a dam. For example, it is common for a fresh water source to be located within 100 km of a denser urban area.

It would be advantageous if there was a manner in which these currently unutilised sources of water in or near urban areas could be captured and utilised for the provision of water to these urban areas.

SUMMARY OF THE INVENTION

In a first aspect the invention provides a method of storing water comprising restraining at least one flexible storage reservoir in a submerged position within a body of salt water; establishing a terrestrial intake in fluid communication with the flexible storage reservoir; and establishing a terrestrial outlet in fluid communication with the flexible storage reservoir for the release of stored water.

This method provides the advantage that valuable land is not consumed for the storage of water. It also has the further advantage that the more dense salt water results in the free surface of the stored water above the free surface of the salt water in which the reservoir is restrained. This can save significant amounts of power when the water is being recovered from the reservoir.

In one embodiment of the invention, the intake and the outlet are in fluid communication with the flexible storage reservoir via a common conduit. This conduit can have the fluid from the intake and the outlet partitioned from each other or in a common pipe. The intake and outlet may also be common (i.e. embodied in a single unit).

In one form, there are at least two flexible storage reservoirs and these reservoirs are in fluid communication with each other by means of an interconnection manifold.

Where more than one source of water is available for capture, an embodiment of the invention may involve establishing more than one terrestrial intake for the capture of water from, for example, rivers, stormwater channels or rainwater systems.

The various sources of water typically have different supply characteristics. For example, stormwater run-off usually provides a high volume of water in a relatively short time period. The extent of water captured in this situation can be improved by the provision of a surge tank in fluid communication with the terrestrial intake. When a storm surge occurs the excess flow can be accumulated within the surge tank and then over time can pass to the storage reservoir.

The surge tank can be formed by one of many methods. The tank can be in the form of a conventional concrete tank but such tanks can be quite obtrusive. Alternatively, the surge tank can be formed by terrestrial excavation where situations permit. This offers the advantage of concealing the surge tank.

The surge tank does not have to be located on a coastal fringe. It could be, for example, located in the hills or mountainside remote to the storage reservoir and/or remote to the intake.

In some situations, the water in its captured form may not be suitable as potable water. In these situations, an embodiment of the invention may involve the additional step of treating the water from the terrestrial outlet. Treatment may also occur at the intake.

In a further aspect of the invention there is provided a method of licensing stored water wherein the cost of a license is based on the catchment area upstream of the terrestrial intake. Alternatively, the cost can be based on the average volume of water that passes through the terrestrial intake over a time period. Other possible licensing models include models where the cost is based on the maximum storage capacity of the storage reservoir or the utilisation of that capacity over a given time period.

In a further aspect, the invention provides a flexible water storage reservoir for use with a submerged water storage system comprising a flexible fluid impervious container, at least one manifold attachment means, at least one manifold positioned within the container, the at least one manifold attachment means being arranged to keep the at least one manifold in a position such that water flow can be maintained as the storage reservoir is emptied.

The positioning of the manifold is important when water is being drawn from the storage reservoir. In some circumstances, it is possible for pockets to form in the flexible storage reservoir walls, these pockets inhibiting the extraction of water from the storage reservoir. The positioning of the manifold can mitigate this.

There are several configurations of manifolds that can facilitate the extraction of water from the storage reservoir. In one embodiment, the manifold is elongate and a water inlet stream and a water outlet stream enter and exit at opposite ends of the manifold. In another embodiment, a water inlet stream and a water outlet stream enter and exit via different manifolds.

The extraction of water from the storage reservoir can also be facilitated by the provision of a support that prevents walls of the flexible container from inhibiting the water flow as the storage reservoir is emptied. The flexible container may also be provided with a pressure relief valve that prevents damage to the flexible container from excess pressure.

In an alternate embodiment of the invention, the container further comprises an attachment mechanism for attaching the flexible water storage reservoir into configuration with one or more other flexible water storage reservoirs. This attachment mechanism enables the storage reservoirs to be assembled into a number of different configurations. These configurations include, for example, placement next to each other or stacking on top of each other. In one particular embodiment, the attachment mechanism allows the flexible water storage reservoirs to be configured and locked into a honeycomb configuration. This honeycomb configuration minimises the space between the reservoirs and this in turn minimises the amount of space available for marine life to grow on the reservoirs. Also, when the reservoirs are in this configuration, the outer reservoirs in the configuration protect the inner reservoirs from damage.

In a further aspect, the invention provides a water storage system comprising a plurality of flexible water storage reservoirs wherein the manifold for the or each of the reservoirs are interconnected using an interconnection manifold.

In a particular embodiment of this system, the flexible water storage reservoirs are arranged into a honeycomb configuration.

In other embodiments, the interconnection manifold is in fluid communication with either or both of a terrestrial intake and a terrestrial outlet.

Embodiments of the system may also have a surge tank in fluid communication with the terrestrial intake. When appropriate, embodiments of the invention can have this surge tank formed by terrestrial excavation. Embodiments of the system can also have a water treatment plant connected to the terrestrial outlet (or even to the intake).

When embodiments of the system are positioned in a body of salt water, the flexible water storage reservoirs can be anchored in position to prevent them moving out of position. Also, when the flexible water storage reservoirs are in position, the anchoring can prevent potentially buoyant storage reservoirs from moving.

In a further aspect, the invention provides a water storage system comprising a flexible storage reservoir submersible in use within a body of salt water; and a terrestrial reservoir positionable terrestrially in use and in fluid communication with the storage reservoir; wherein the system is configured such that there is no restriction to water flowing from the storage reservoir to the terrestrial reservoir.

In particular embodiments, of the total mass of water stored, the mass of water held in the terrestrial reservoir above the free surface of the body of salt water is approximately 2.5% of the total mass stored. This mass of water held above the free surface of the saltwater can be utilised to raise the water into reservoirs or other locations for use as a source of water. Such a mass can also be held above the free surface of salt water through the action of the salt water body on the flexible storage reservoir.

In particular embodiments, valves may be used that are configured into a charging state where water head pressure from the terrestrial reservoir forces the water into the storage reservoir. After charging, the valves may be reconfigured into a discharge state where conserved head pressure forces the stored water through an auxiliary line such that a portion of the stored water is pushed to a remote location.

BRIEF DESCRIPTION OF THE DRAWINGS

Preferred embodiments of the present invention will now be described by way of example only, with reference to the accompanying drawings in which.

DETAILED DESCRIPTION

In the description that follows similar reference numerals are used to indicate similar elements in different embodiments of the invention.

Figure 1A:
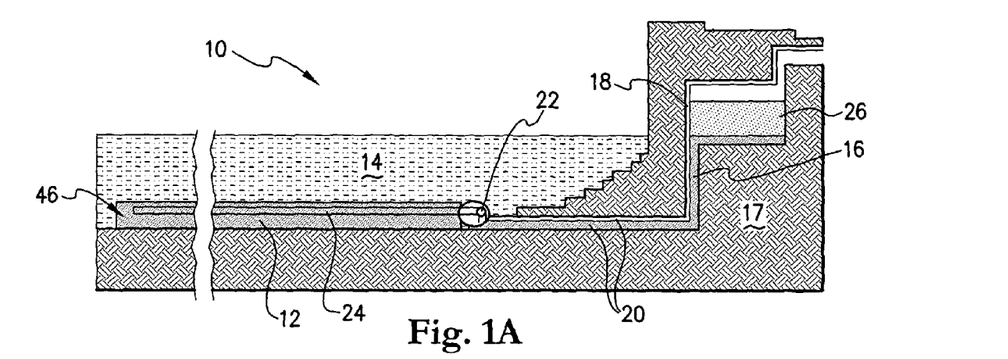
FIG. 1A shows a sectional view of a first embodiment of a water storage system.
Figure 1B:
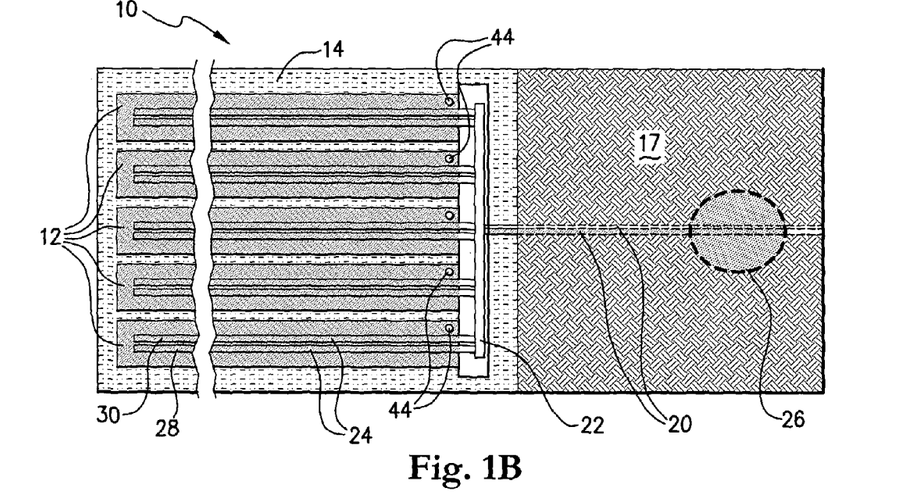
FIG. 1B shows a plan view of the water storage system of FIG. 1A.
Figure 1C:
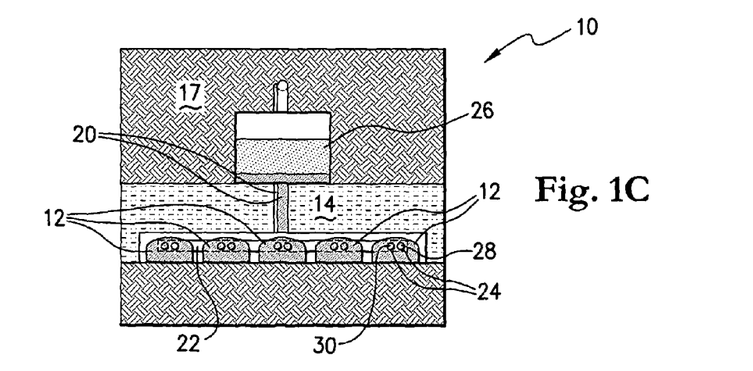
FIG. 1C shows a sectional view of the water storage system of FIG. 1A.

FIGS. 1 to 4 show various configurations of possible embodiments of the water storage system. FIG. 1 shows a water storage system 10 having five flexible storage reservoirs in the form of containers 12 restrained in a body of salt water 14 and in fluid communication with a terrestrial intake 16 positioned in the land 17 and a terrestrial outlet 18 located adjacent the body of saltwater 14.

In use, water from for example, a river, stormwater or rainwater passes in through the terrestrial intake 16 and thence into the containers 12. Water can be withdrawn from the containers 12 by drawing water from the terrestrial outlet 18.

In this embodiment, a water storage tank 26 has also been excavated into the rock as a surge tank. In alternate embodiments, this tank can be in the form of a conventional above-ground tank such as a concrete or steel tank. The tank 26 acts as an accumulator to allow surges in the flow of water to be buffered until the water has had time to pass through the terrestrial intake 16 and into the containers 12. This ability to buffer the water increases the extent of water capture by the system and can decrease overflow losses.

Water can be drawn from the outlet 18 for typical stored water uses. For example, the water can be passed into a water treatment plant (not shown) for subsequent distribution as domestic potable water. Other applications include using treated or untreated water in industrial and agricultural applications (eg. irrigation).

The intake 16 and the outlet 18 are connected to the containers 12 by separate conduits 20. The use of separate conduits facilitates the mixing of water within the containers 12. However, the intake 16 and the outlet 18 can share a common conduit which can decrease the cost involved in implementing the system. The conduits 20 can be cut into the rock and can then continue as seabed pipes to the containers 12.

The containers 12 are connected to each other by an interconnection manifold 22 which takes water from extraction manifolds 24 positioned within each of the containers 12. The interconnection manifold 22 passes water to and from the conduits 20 and distributes the water between the containers 12.

In the embodiment shown in FIG. 1, there are two extraction manifolds 24 in each container 12. An inlet manifold 28 receives water from the intake 16 and an outlet manifold 30 withdraws water from the container. In other embodiments of the invention, a single manifold can act as both the inlet and outlet manifold.

In an alternate embodiment, there are two interconnection manifolds located at opposing ends of a container. These interconnection manifolds are connected to opposing ends of a combination inlet/outlet manifold. In use, water from an intake passes into the container via the first of the manifolds and water is passed from the container to an outlet via the other manifold.

Figure 6A:
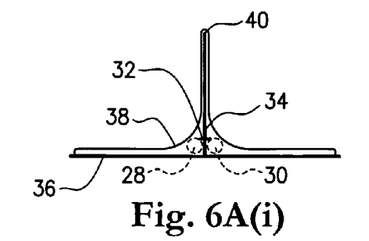
FIGS. 6A to 6C show various flexible storage reservoirs.
Figure 6B:
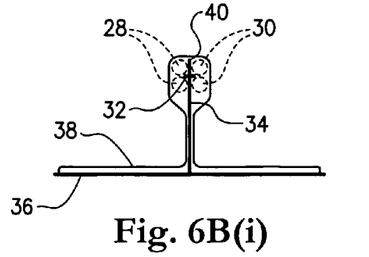
Figure 6C:
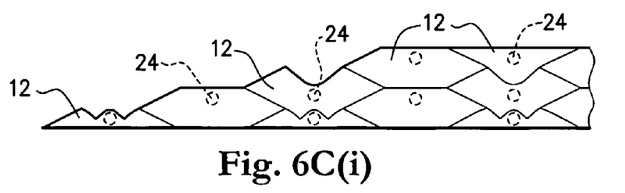

Referring now to FIGS. 6A to 6C several configurations for the containers 12 are shown. Different configurations of both the shape of the containers 12 and configuration of the extraction manifolds 24 are shown.

FIGS. 6A(i) and 6A(ii) show an embodiment of the system in an empty state and a full state respectively, with the extraction manifolds 24 positioned within the container 12. A vertical support 34 projects from the rigid base 36 of the container 12 and, in use, supports a flexible membrane 38 of the container 12 when the container 12 is in an empty state.

Each of the manifolds 24 are attached to an attachment mechanism 32 which is integrated into the support 34. The positioning of the manifolds 24 on the support 34 with the attachment mechanism 32, assists in maintaining the flow of water by preventing the flexible membrane 38 from obscuring the water ports on the extraction manifolds 24. The container 12 is also provided with a pressure relief valve 44. The pressure relief valve 44 prevents damage to the container 12 if excess water pressure builds up within the container 12.

An alternate embodiment of the system in both an empty and full states is shown in FIGS. 6B(i) and 6B(ii). In this embodiment, four extraction manifolds 24 (two inlet and two outlet manifolds) float at a distal end 40 of a vertical support member 34 which projects from a rigid base 36 of the container 12. In this embodiment, as the container 12 moves towards an empty state, a void is maintained in the region below the distal end 40 of the vertical support member 34 where the flexible membrane 38 drapes over the support and the extraction manifolds 24.

In this embodiment, the four extraction manifolds 24 are buoyant and slidable along the support 34.

Another alternate embodiment of the system in both empty and full states is shown in FIGS. 6C(i) and 6C(ii). In this embodiment, the hexagonal shaped containers 12 are interconnected into a stacked honeycomb configuration. This honeycomb arrangement has the advantage that as the containers 12 approach an empty state, the extraction manifolds 24 from vertically aligned containers 12 stack upon each other to assist in preventing the flexible membrane 38 from obscuring the water ports on the extraction manifolds 24.

To facilitate the locking of the containers 12 into a given configuration, locking elements 42 as illustrated in FIG. 6C(iii) are provided at the margins of the containers 12. Alternate male and female locking elements are provided on opposing sides of the containers 12 to allow a series of similar containers to be locked into configuration.

In alternate embodiments, oval or rectangular containers can be stacked into a similar close-packed configuration. By positioning the containers into a stacked configuration, the space available for marine life to establish between the containers is minimised. The stacked configuration also offers the advantage that the outermost containers protect the inner containers from damage. Therefore, even if there is animal attack upon the system, or other damage such as storm damage, the outermost containers provide a sacrificial barrier to the inner containers.

In order to prevent contamination of the stored water in a non-damaged container by a rupture in a now damaged container, the system is also provided with a salinity monitor 46. When an increase in the saline content of the container 12 is detected, a valve operates to isolate the extraction manifold 24 of the contaminated container 12 from the interconnection manifold 22.

There are several possible ways in which the containers 12 can be secured to the floor of the body of saltwater. In one embodiment, nylon anchors are drilled into the seabed and the containers 12 are tethered to these anchors. In an alternate embodiment, the containers 12 can use concrete weights in pouches in each container 12 that can act as ballast. The method by which the containers 12 are secured to the floor of the body of sea water may also be a function of location. For example, if the containers are to be positioned on the floor of a lake, use of concrete weights may be sufficient to secure the containers 12. However, if the bags are to be positioned out to sea, a more robust securing mechanism such as the nylon anchors may likely need to be utilised.

Figure 2A:
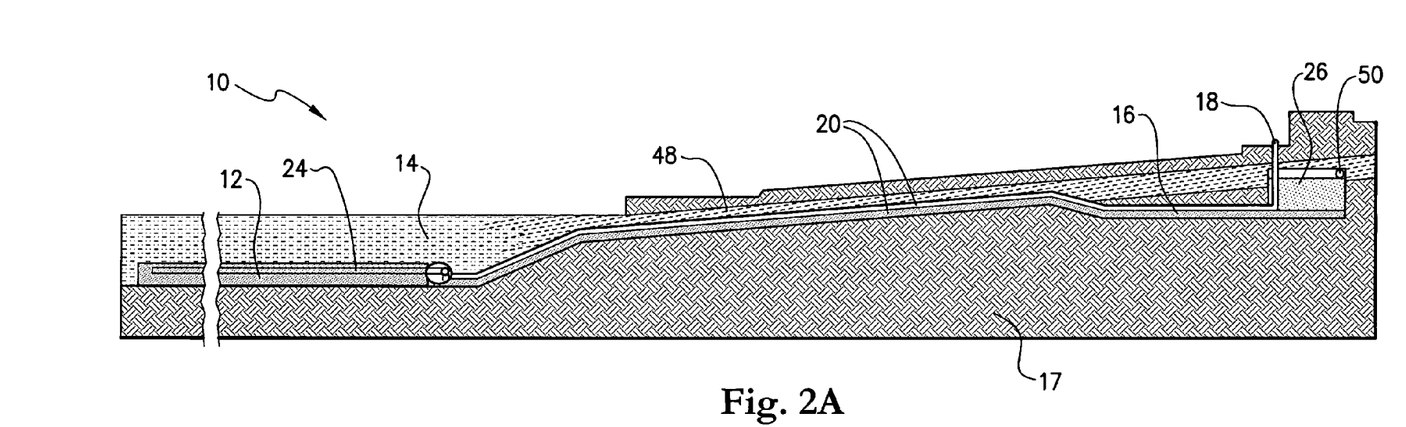
FIG. 2A shows a sectional view of a further embodiment of a water storage system.
Figure 2B:
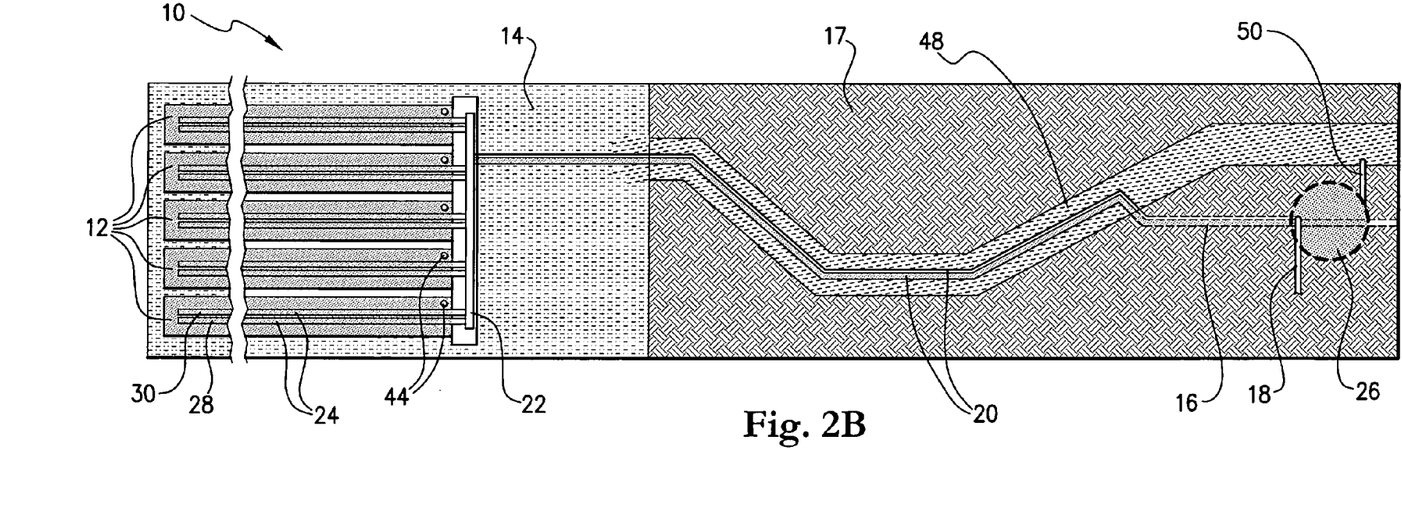
FIG. 2B shows a plan view of the water storage system of FIG. 2A.
Figure 3A:
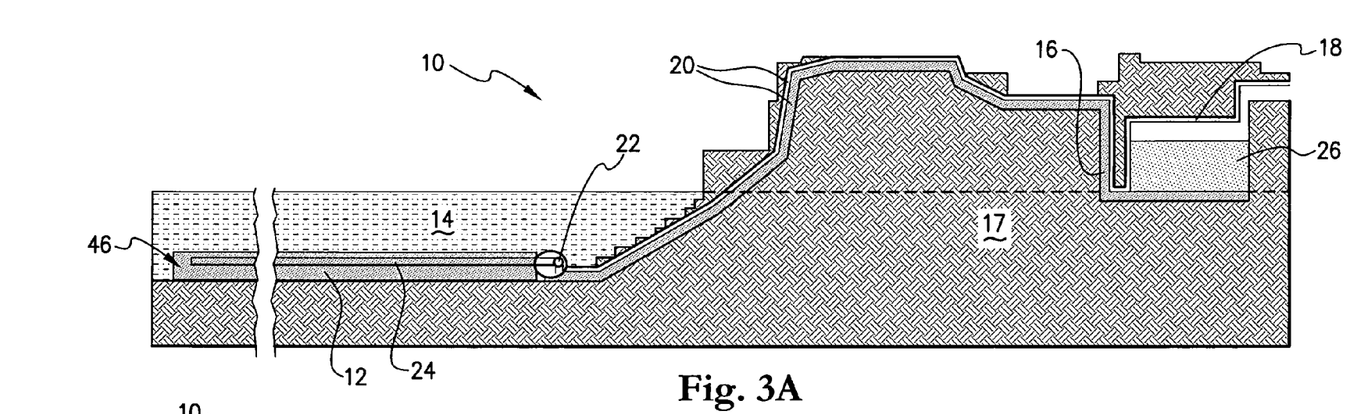
FIG. 3A shows a sectional view of a further embodiment of a water storage system in inland configuration.
Figure 3B:
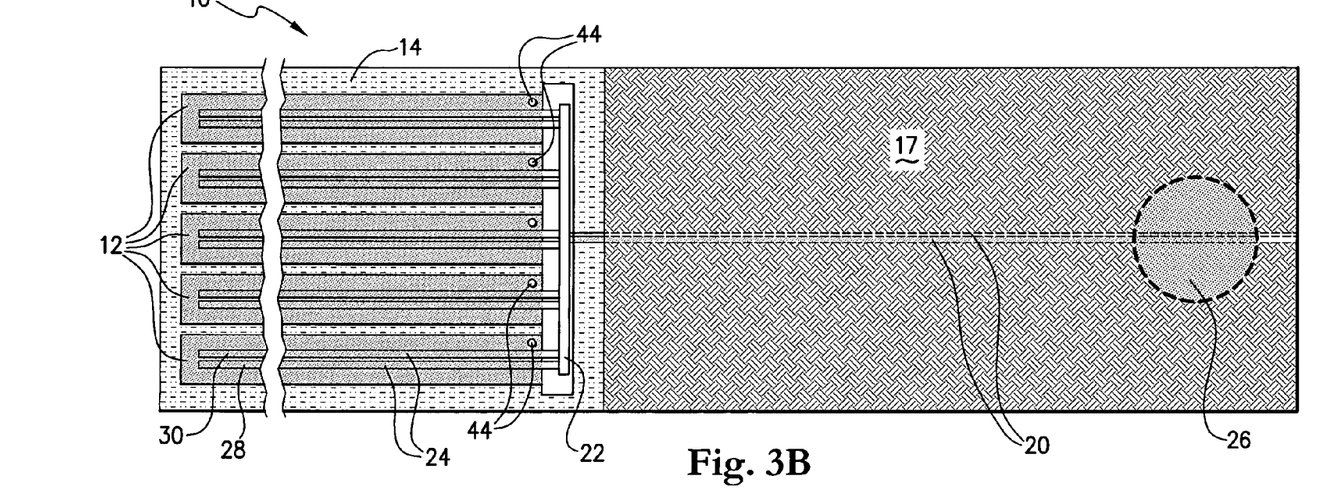
FIG. 3B shows a plan view of the water storage system of FIG. 3A.
Figure 4:
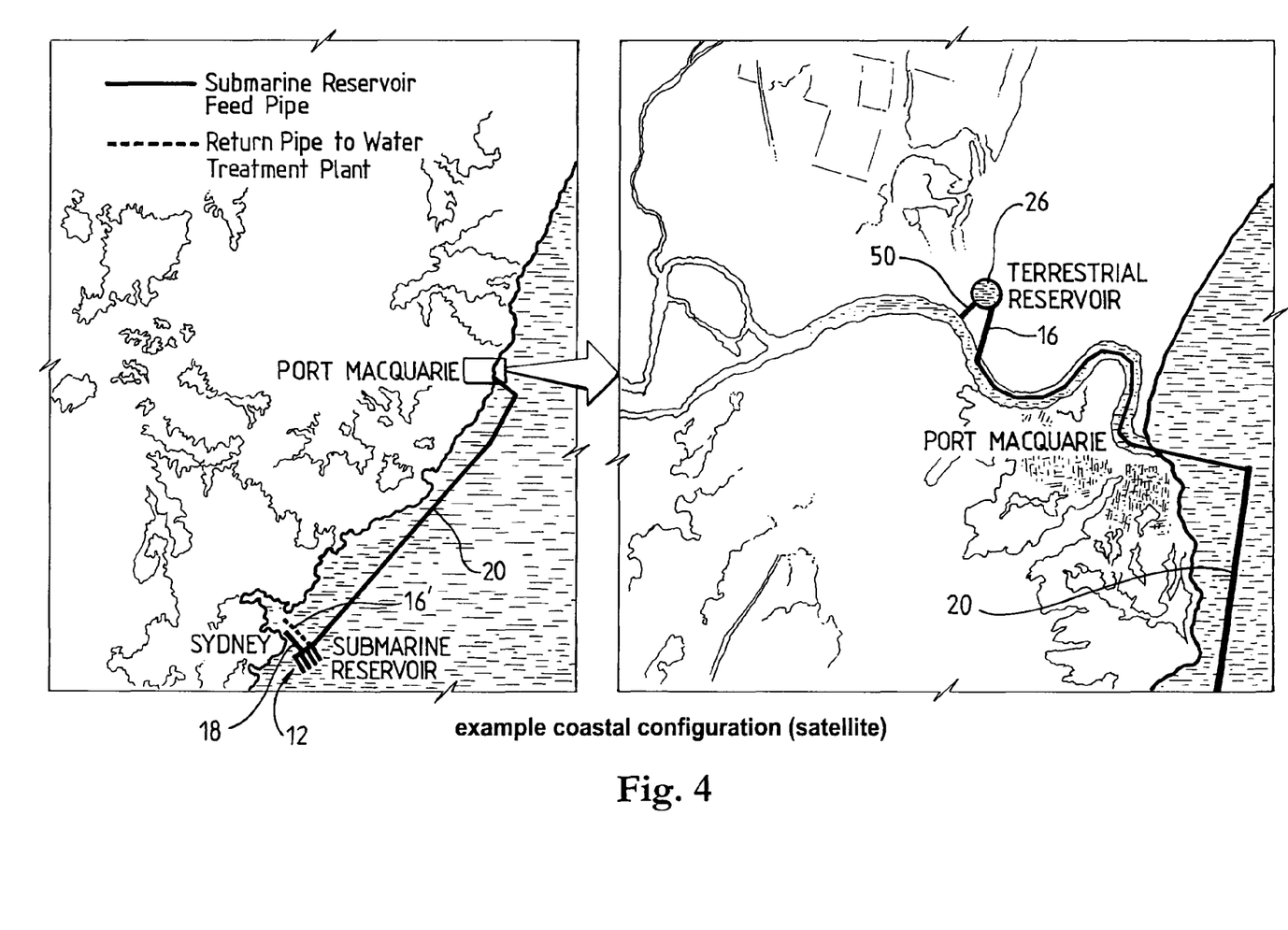
FIG. 4 shows a further embodiment of a water storage system configured with a geographically remote terrestrial intake.

FIGS. 2 to 4 illustrate alternate embodiments of the submarine water reservoir.

In FIG. 2, a system is set up in a coastal configuration with a water surge tank 26 positioned adjacent a river 48. A feed conduit 50 diverts water from the river 48 into the surge tank 26. The surge tank 26 and a terrestrial outlet 18 are connected to the containers 12 by means of conduits 20. These conduits are positioned on the riverbed. The outlet 18 is connected to a water treatment plant (not shown). In use, a surge in water flow from the river can be accumulated in the tank 26 until the water has had sufficient time to pass down the conduit 20 to the storage container 12.

In FIG. 3, a system is shown in an inland configuration. In this embodiment, once the conduits 20 have been primed with water, the volume of water displaced from containers 12 by the dense sea water maintains the conduits in the primed state and decreases the cost of pumping required to extract water back from the containers 12. In such a system, a single conduit can be used for both the input and output of water from the containers 12.

In FIG. 4, a system is shown with the primary intake 16 spaced several hundred kilometres away from the containers 12. A surge tank 26 is provided adjacent to a remote river with a feed conduit 50 diverting water into the surge tank 26. A secondary intake 16' is also provided in this embodiment. Both primary intake 16 and the secondary intake 16' are connected to a common interconnection manifold 22 to then interconnect the containers 12 to the intakes.

When the water needs to be conveyed large distances, a pump may be used to increase the head pressure in the conduit 20 that carries the water to the containers 12.

Figure 5A:
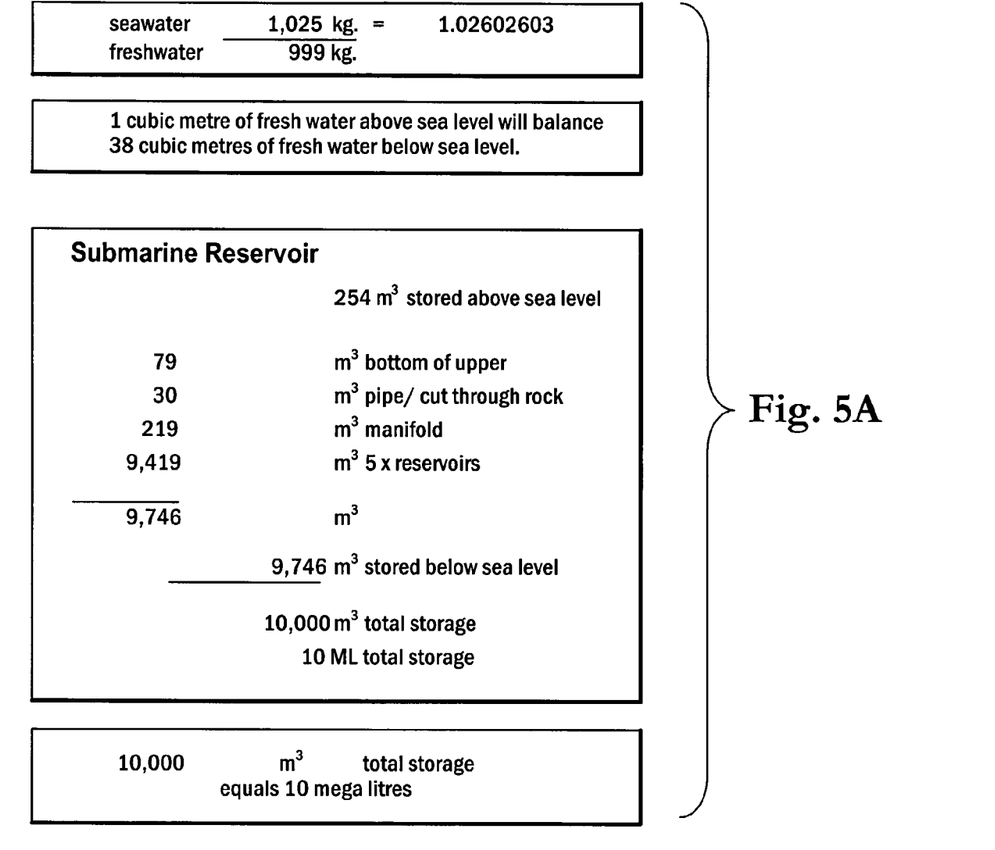
FIGS. 5a and 5b show sample reservoir storage calculations.
Figure 5B:
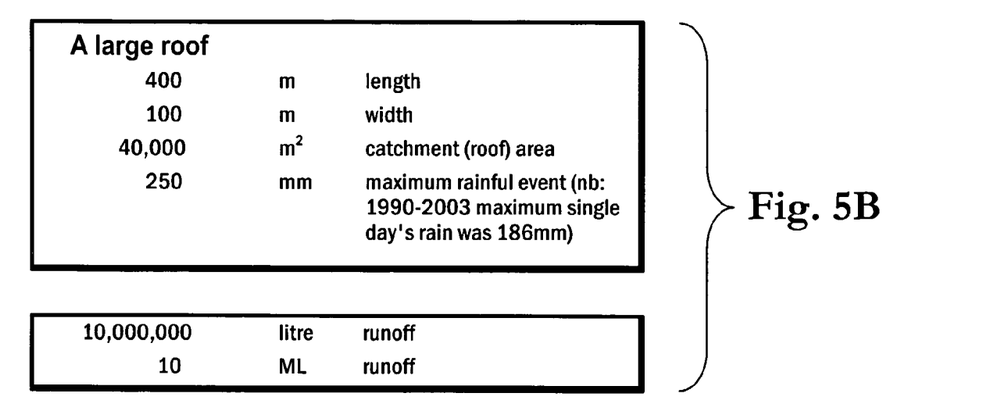

FIG. 5 shows sample reservoir storage calculations. Once the storage requirements for a location are determined, system components can be selected to achieve a given storage requirement. In FIG. 5A, the design requirements for a 10,000,000 L system are shown.

In FIG. 5B, a catchment area and a catchment volume for the catchment area are calculated. In this example, the roof area of a stadium is calculated to generate 10,000,000 L/annum of water for storage.

In the licensing of these systems, the cost of the licence can be determined using various parameters. For example, the licence cost can be based on the catchment size or the storage size. The cost can be based on the average annual water catchment volume over a time period or the area of catchment. Alternatively, the cost of the licence can be based on maximum storage capacity for storing water or the utilisation of that capacity. A cost can be calculated by determining the catchment volume and then multiplying this value by a unit cost. This cost can then be paid annually by a licensee.

Although the present invention has been described with reference to particular embodiments, it will be appreciated by those skilled in the art that the invention may be embodied in many other forms. For example, the flexible storage reservoirs can be restrained by pylons. Also, other conventional water treatment steps may be used in conjunction with the system. For example, pretreatment may be performed on the water before entering the storage reservoirs.

The invention claimed is:

1. A method of storing water comprising:
   restraining at least one flexible storage reservoir in a submerged position within a body of salt water;
   establishing a terrestrial intake in fluid communication with the flexible storage reservoir;
   establishing a surge tank in fluid communication with the terrestrial intake;
   establishing a terrestrial outlet in fluid communication with the flexible storage reservoir for the release of stored water, the outlet being different to the intake; and
   wherein a valve is used with each of the intake and outlet such that, during charging of the or each storage reservoir, the inlet valve is opened and the outlet valve is closed and such that, during discharging of the or each storage reservoir, the inlet valve is closed and the outlet valve is opened; and
   wherein during charging water head pressure from a terrestrial reservoir forces water into the or each storage reservoir.

2. A method of storing water according to claim 1, wherein during discharging conserved head pressure and/or external salt water body pressure forces water out of the or each storage reservoir.

3. A method of storing water according to claim 1, wherein the intake and outlet are configured by separate conduits, are partitioned from each other or are in a common pipe, to enable the respective fluid communication with the reservoir.

4. A method of storing water according to claim 1, wherein the surge tank is formed by terrestrial excavation.

5. A method of storing water according to claim 1, wherein the surge tank is positioned at a river, stormwater or rainwater system to increase the extent of the water capture.

6. A method of storing water according to claim 1, further comprising the step of treating the water from the terrestrial outlet.

7. A method of storing water according to claim 1, wherein terrestrial intake and the terrestrial outlet are spaced apart geographically.

8. A method of storing water comprising:
   restraining at least one flexible storage reservoir in a submerged position within a body of salt water;
   establishing a terrestrial intake in fluid communication with the flexible storage reservoir;
   establishing a surge tank in fluid communication with the terrestrial intake;
   establishing a terrestrial outlet in fluid communication with the flexible storage reservoir for the release of stored water, the outlet being different to the intake; and
   establishing a further terrestrial intake in fluid communication with the flexible storage reservoir to enable distributed water intake.

9. A method of storing water according to claim 8, wherein the terrestrial intake is positioned at a river, stormwater or rainwater system to capture the water.

10. A method of storing water comprising:
    restraining at least one flexible storage reservoir in a submerged position within a body of salt water;
    establishing a terrestrial intake in fluid communication with the flexible storage reservoir;
    establishing a surge tank in fluid communication with the terrestrial intake; and
    establishing a terrestrial outlet in fluid communication with the flexible storage reservoir for the release of stored water, the outlet being different to the intake;
    wherein there are at least two flexible storage reservoirs and the at least two flexible storage reservoirs are interconnected in fluid communication with each other by an interconnection manifold.

11. A flexible water storage reservoir for use with a submersed water storage system comprising a flexible fluid impervious container, at least one manifold attachment means, at least one manifold positioned within the container, the at least one manifold attachment means being arranged to keep the at least one manifold in a position such that water flow can be maintained as the storage reservoir is emptied.

12. A flexible water storage reservoir according to claim 11, wherein the at least one manifold is elongate and a water inlet stream and a water outlet stream enter and exit at opposite ends of the at least one manifold.

13. A flexible water storage reservoir according to claim 11, wherein a water inlet stream and a water outlet stream enter and exit via different manifolds.

14. A flexible water storage reservoir according to claim 11, wherein the container further comprises a support that prevents walls of the flexible container from inhibiting the water flow as the storage reservoir is emptied.

15. A flexible water storage reservoir according to claim 11, wherein the container further comprises an attachment mechanism for attaching the flexible water storage reservoir into configuration with one or more other flexible water storage reservoirs.

16. A flexible water storage reservoir according to claim 15, wherein the attachment mechanism allows the flexible water storage reservoir to be configured and locked into a honeycomb configuration with one or more other flexible water storage reservoirs.

17. A water storage system comprising a plurality of flexible water storage reservoirs according to claim 15 wherein the manifolds for each of the reservoirs are interconnected using an interconnection manifold.

18. A water storage system according to claim 17, wherein the flexible water storage reservoirs are arranged into a honeycomb configuration.

19. A water storage system according to claim 17, wherein the interconnection manifold is in fluid communication with either or both of a terrestrial intake and a terrestrial outlet.

20. A water storage system according to claim 19, wherein a surge tank is in fluid communication with the terrestrial intake.

21. A water storage system according to claim 20, wherein the surge tank is formed by terrestrial excavation.

22. A water storage system according to claim 19, wherein water from the terrestrial outlet is treated by a water treatment plant.

23. A water storage system according to claim 17, wherein the flexible water storage reservoirs are, in use, anchored into position on a floor of a body of salt water.

24. A water storage system according to claim 17, wherein the flexible water storage reservoirs incorporate a salinity monitor that prevents contamination of the system if a storage reservoir is ruptured.

* * * * *